(No Model.) 2 Sheets—Sheet 1.
J. C. HART.
CULTIVATOR.
No. 273,071. Patented Feb. 27, 1883.
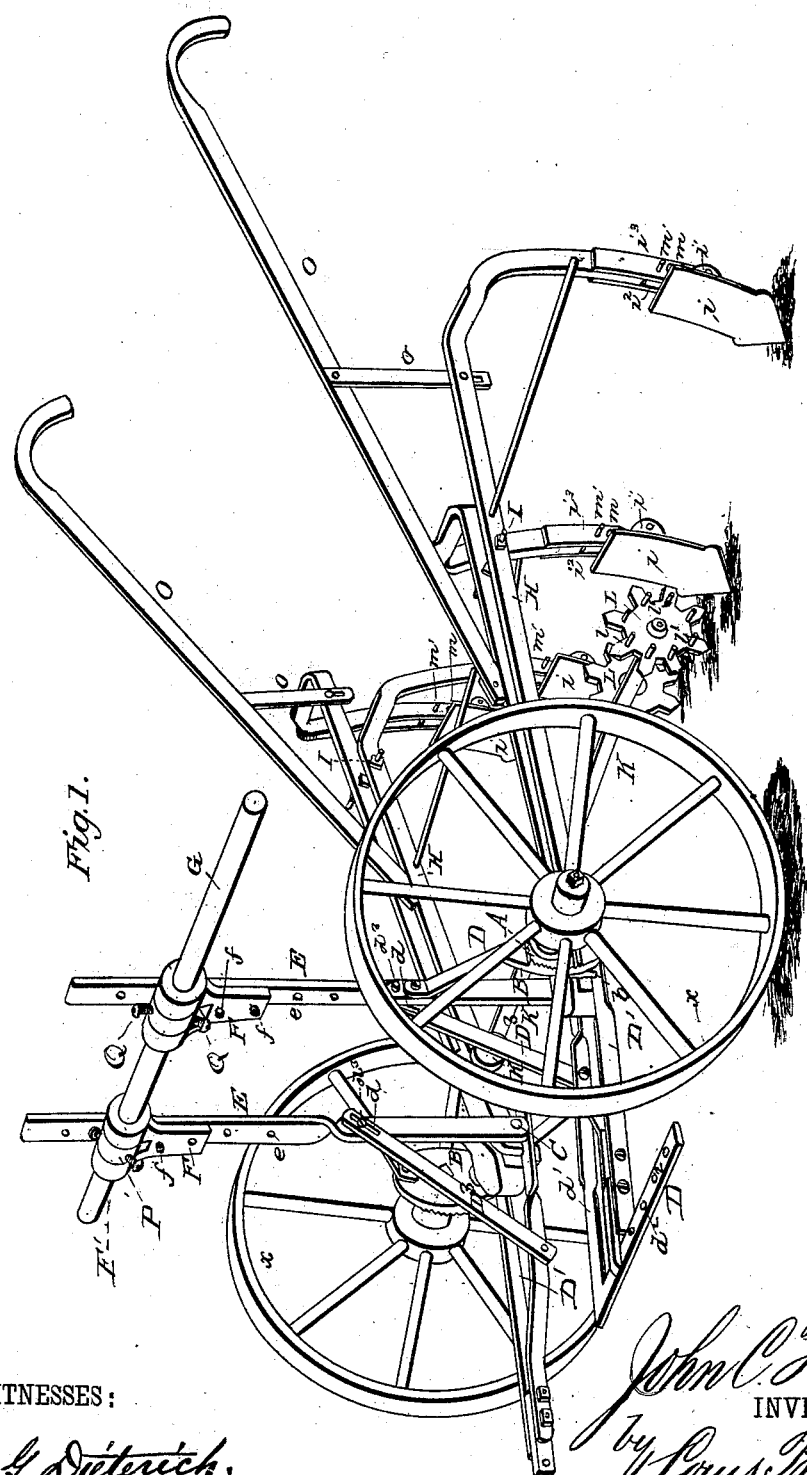

(No Model.) 2 Sheets—Sheet 2.
J. C. HART.
CULTIVATOR.
No. 273,071. Patented Feb. 27, 1883.
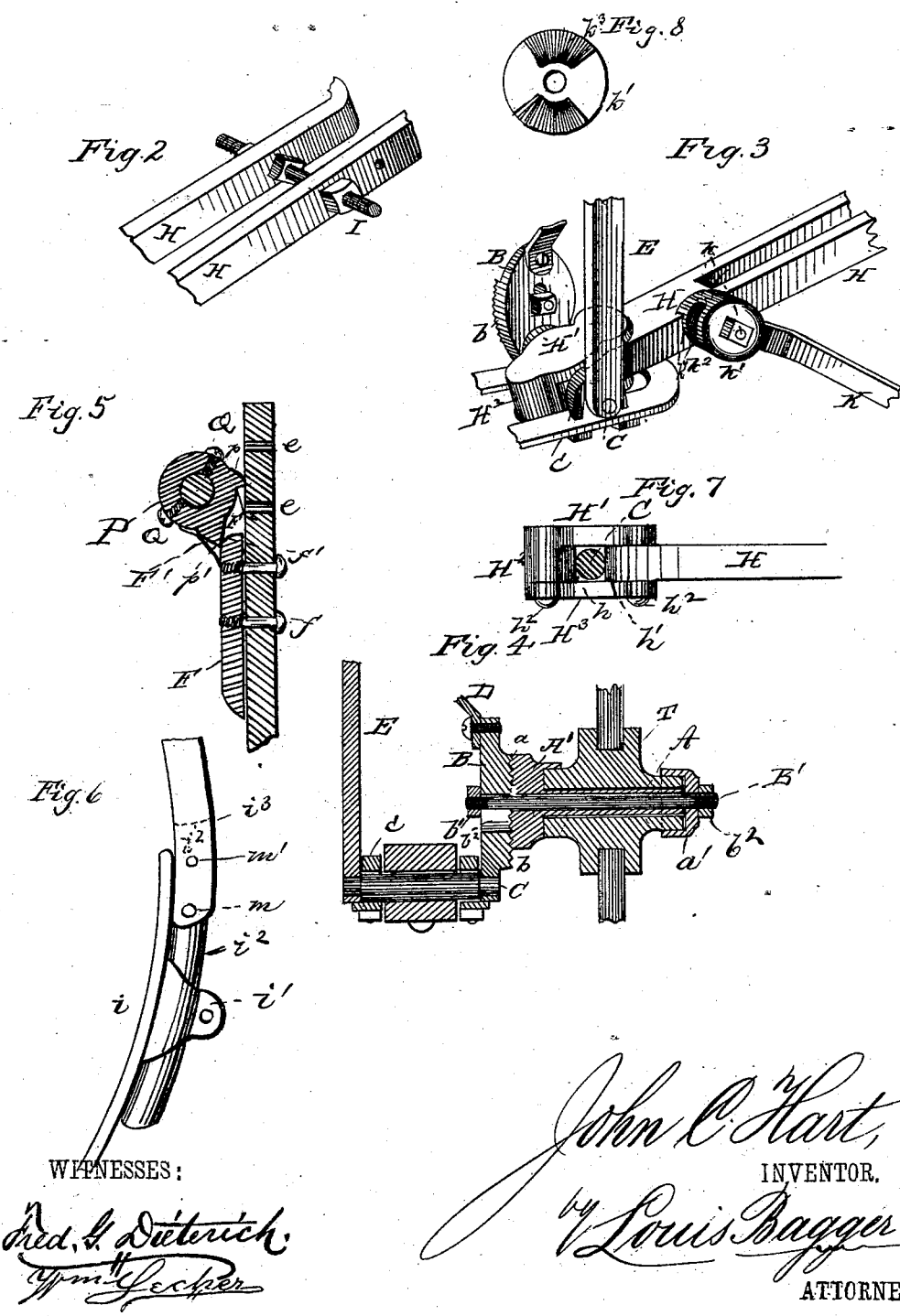

UNITED STATES PATENT OFFICE.

JOHN C. HART, OF GREEN'S FORK, INDIANA.

CULTIVATOR.

SPECIFICATION forming part of Letters Patent No. 273,071, dated February 27, 1883.

Application filed November 11, 1882. (No model.)

*To all whom it may concern:*

Be it known that I, JOHN C. HART, of Green's Fork, in the county of Wayne and State of Indiana, have invented certain new and useful Improvements in Cultivators; and I do hereby declare that the following is a full, clear, and exact description of the invention, which will enable others skilled in the art to which it appertains to make and use the same, reference being had to the accompanying drawings, which form a part of this specification.

Figure 1 is a perspective view of my improved cultivator. Fig. 2 is a detail view, showing the device for adjusting the beams. Fig. 3 is a similar view of the parts near and around the axle. Fig. 4 is a vertical section through the axle and stub-axle. Fig. 5 is a similar view through the upper part of the standard. Fig. 6 is a side view of one of the shovels and its fastenings. Fig. 7 is a side view of the head of the cultivator-beams, and Fig. 8 is detail view of one of the clamping-disks for the clearers.

Similar letters of reference indicate corresponding parts in all the figures.

My invention has relation to tongueless straddle-row cultivators; and it consists in the improved construction and combination of parts of the same, as hereinafter more fully described and claimed.

In the accompanying drawings, the letter $x$ indicates the wheels upon which the forward ends of the cultivator rest. The hubs T of these wheels turn upon hollow spindles A, the inner parts of which form plates A', the inner faces, $a$, of which are serrated, and bear against the serrated faces $b$ of the axle-plates B. These serrated plates are held together by bolts B', passing through the spindles and secured upon their inner and outer ends by nuts $b'$ and $b^2$. The outer nut, $b^2$, also serves to secure the wheel upon its spindle by bearing against a cap, $a'$, which has a central aperture for the end of bolt B', and the inward-bent edges of which rest over and around the end of the hub.

The axle-plate B has a vertical slot, $b^2$, through which the inner end of bolt B' passes, and in which the end, and with it the hollow spindle, may be adjusted at any place by tightening the nuts $b'$ $b^2$, the serrated faces of the plates A' and B preventing it from moving.

A short shaft, C, and a brace, D, connect the axle-plates to the upright E, and the draft-bars are fastened to this shaft by means of clips $c$, while the head of the bifurcated cultivator-beams H is hinged upon the same.

The draw-frame consists of a bar, D', bent at its center and fastened by the clips $c$ to shaft C, immediately in front of its bent portion, the latter supporting the forward ends of the cultivator-beams. The forward ends of bar D' are connected to a clevis-plate, D², having a rearward-projecting part, $d'$, which is fastened to one of the bars D', while the plate has a series of perforations, $d^2$, into which the single-trees of the draft-animals may be hooked, enabling the draft to be adjusted laterally.

The draw-frames may be raised or lowered by means of braces D³, having longitudinal slots $d$ in their upper ends, through which pass screws $d^3$, which fasten them adjustably to the standards E.

From the upper sides of the end of the bifurcated cultivator-beams H project plates H', having downward projections H², the inner sides, $h$, of which are rounded to both sides, and between which and the similarly-rounded ends $h'$ of the cultivator-beams the shafts C are held, the under sides of plates H' resting upon them.

A plate, H³, is fastened to the under side of projection H² and the end of the beam H by bolts or screws $h^2$, the said plate holding the end of the beam in place, the whole forming a universal joint. The bifurcated cultivator-beams are bent downward, forming standards, while the bifurcated parts may be adjusted nearer to or farther from each other by means of screw-threaded bars I passing through them, and provided with adjusting-nuts on each side of the beams.

The handles O are fastened to the beams, and are provided with downward-pointing slotted braces $o$, by which the handles may be adjusted to the height of the workman.

The lower ends, $i^3$, of the cultivator-standards are slotted, and the upper flat part of the bars $i^2$, to which the shovels $i$ are fastened, are hinged in these slots upon pins $m$.

The shovels $i$ are provided upon their rear sides with projecting lips $i'$, which are clamped about the lower round parts of bars $i^2$, and secured together by screws at their outer ends, so that the shovels may be raised and lowered at will.

Above the fulcrum-pins $m$ of bars $i^2$ are holes bored through the sides of the slots and the flat parts of bars $i^2$, through which are inserted wooden plugs or pins $m'$, which will break when the shovels meet with obstructions, allowing them to pass over the obstruction without injury.

The uprights E E are connected adjustably to a cross-rod, G, by means of the brackets F and sleeves P.

The rear sides of the brackets F are recessed longitudinally to slide upon the front sides of the uprights, to which they are secured by means of screws $f$, which fit into a series of screw-holes, $e$, in the uprights. The upper part of each of the brackets forms two eyes, F', through which the rod G passes, and between which, in the recess $F^2$, formed by them, the sleeve P is placed, which slides upon rod G.

This sleeve is provided with two projections, $p$ and $p'$, the upper one, $p$, of which bears against the upright, while the lower one, $p'$, bears against the beveled lower edge, $f'$, of the recess $F^2$.

Two set-screws, Q, secure the sleeve upon the rod G, so that it may be adjusted upon any point of the rod, the projections preventing the sleeve from turning. In this manner the cultivators may be adjusted laterally, while the rod may be raised or lowered, according to the height of the plants in the rows, by moving the brackets upward or downward upon the uprights, as desired.

L L are the fenders or clearers, which consist of two disks pivoted to the rear ends of two bars, K. The edges of these disks are provided with teeth $l$, and pins $l^2$ project laterally from their outer faces, near the edges. These fenders run nearly abreast the shovels, and serve to shield the plants from the dirt thrown aside by the shovels, and to push overhanging plants aside from the shovels, while the laterally-projecting pins serve to assist in pulverizing the dirt and to clear the shovel from gatherings of weeds.

The upper forward ends of bars K are hinged upon nutted bolts $k$, passing through the beams H, and are clamped and held in place by two disks, $k'$ and $k^2$, having serrated projections $k^3$ upon their inner faces, and the inner ones, $k^2$, having recesses $k^4$, by which they are fitted upon beams H, while the outer ones, $k'$, are held upon them by the nuts upon bolts $k$, and the ends of bars K fit into the recesses between projections $k^3$, the bars being slightly adjustable in a vertical plane by turning the outer disks upon the inner ones and tightening the nuts upon the screws.

Having thus described my invention, I claim and desire to secure by Letters Patent of the United States—

1. The combination, in a cultivator of the described class, of the shaft C, fastened between upright E, and axle-plate B, with the head of the cultivator-beam H, having forward-extending plate H', downward-projecting part $H^2$, having inner rounded sides, $h$, and rounded end $h'$, and plate $H^3$, fastened by screws $h^2$, substantially as and for the purpose shown and set forth.

2. In a straddle-row cultivator, the combination of the uprights E, having holes $e$, the brackets F, having eyes F', recess $F^2$, and screws $f$, the transverse bar G, and the sleeves P, having projections $p$ and $p'$, and set-screws Q, substantially as and for the purpose shown and set forth.

3. The clearers L, having toothed rim $l$ and laterally-extending pins $l^2$, as and for the purpose shown and set forth.

In testimony that I claim the foregoing as my own I have hereunto affixed my signature in presence of two witnesses.

JOHN COLUMBUS HART.

Witnesses:
JOSEPH SYKES,
THADDEUS W. O. BRAFFETT.